A. T. BROWN.
TYPE WRITING MACHINE.
APPLICATION FILED MAR. 12, 1906.
974,353.
Patented Nov. 1, 1910.
7 SHEETS—SHEET 4.
Fig. 4.
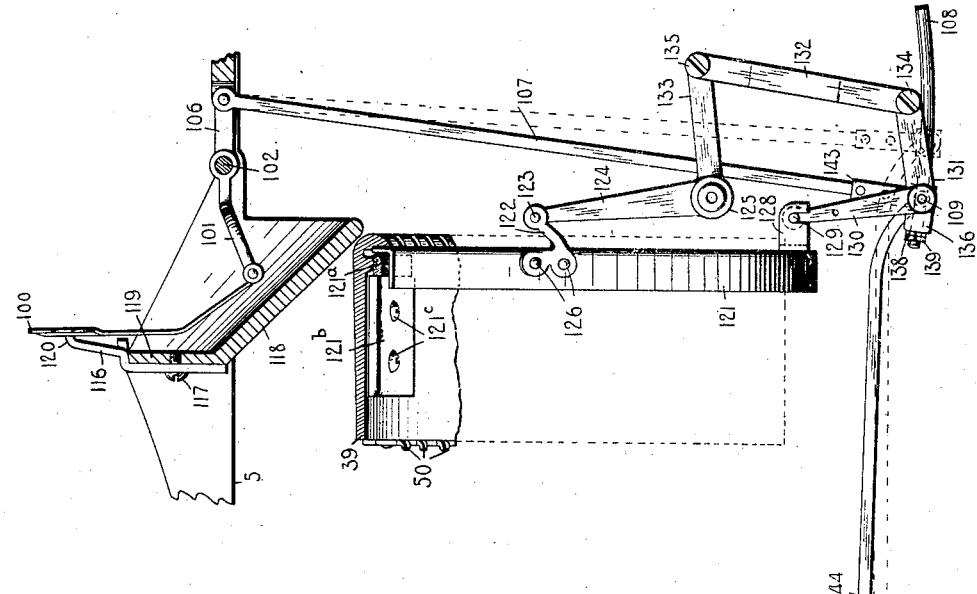
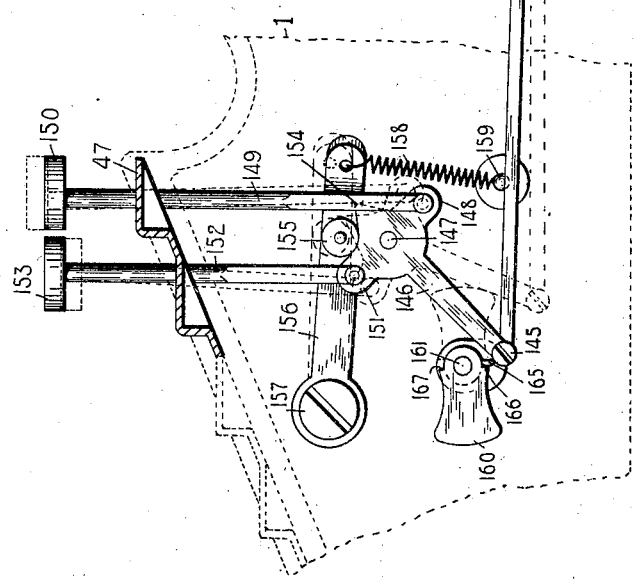
WITNESSES:
E. W. Wells.
R. H. Strother.
INVENTOR.
Alexander T. Brown
BY
Jacob Felbel
ATTORNEY.

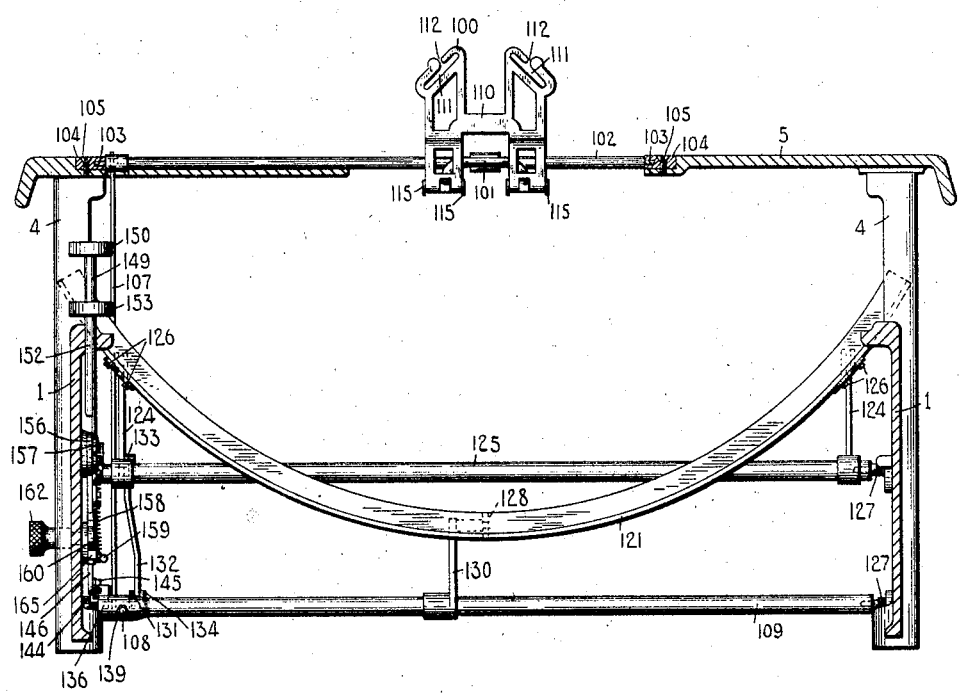
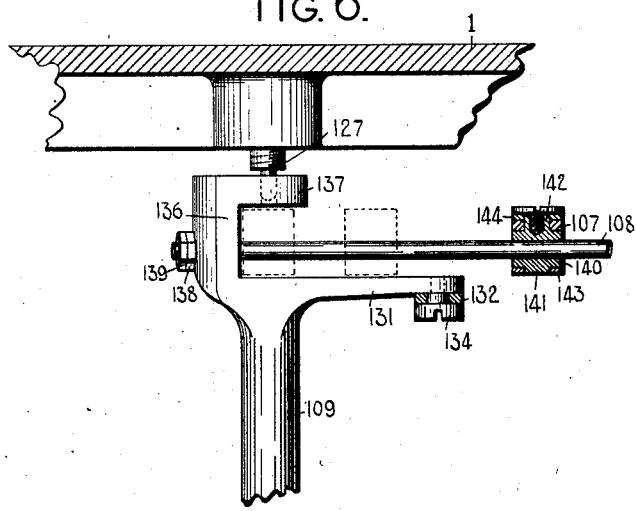

A. T. BROWN.
TYPE WRITING MACHINE.
APPLICATION FILED MAR. 12, 1906.

974,353.

Patented Nov. 1, 1910.
7 SHEETS—SHEET 6.

WITNESSES:
E. M. Wells
R. H. Strother

INVENTOR.
Alexander T. Brown
BY
Jacob Felbel
ATTORNEY.

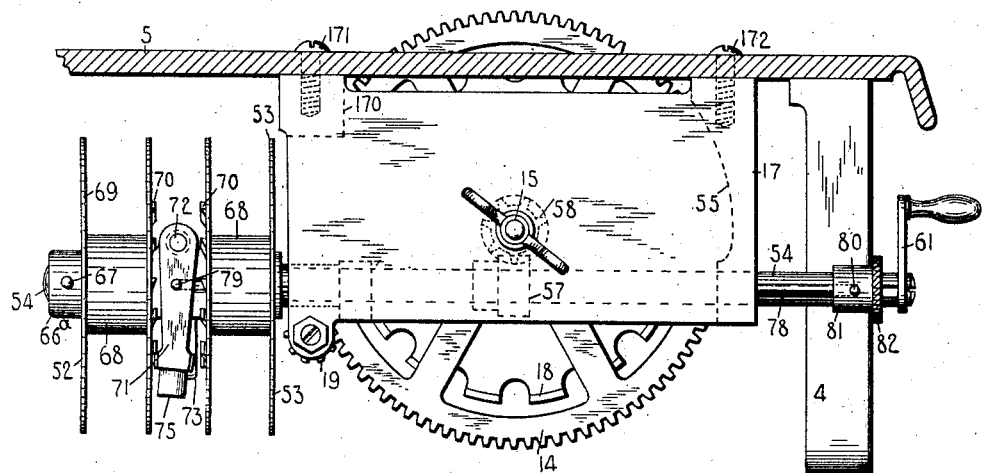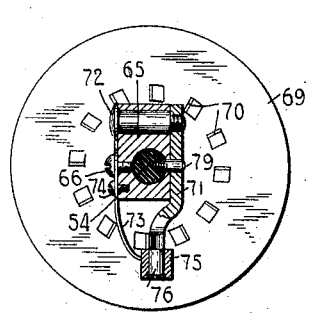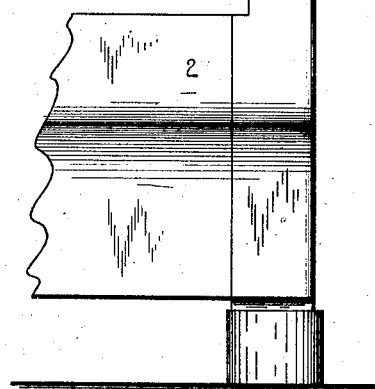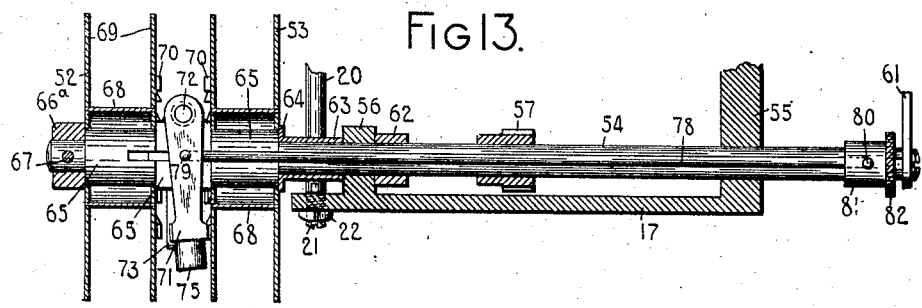

UNITED STATES PATENT OFFICE.

ALEXANDER T. BROWN, OF SYRACUSE, NEW YORK.

TYPE-WRITING MACHINE.

974,353. Specification of Letters Patent. Patented Nov. 1, 1910.

Application filed March 12, 1906. Serial No. 305,561.

*To all whom it may concern:*

Be it known that I, ALEXANDER T. BROWN, citizen of the United States, and resident of Syracuse, in the county of Onondaga and State of New York, have invented certain new and useful Improvements in Type-Writing Machines, of which the following is a specification.

My invention relates to typewriting machines, and particularly to the ribbon mechanism of such machines.

My invention comprises certain improvements in the ribbon vibrator and the means for actuating the same; in the means for driving the ribbon spools and for reversing the direction of feed of the ribbon; means for bringing different longitudinal fields of the ribbon to the printing point; means for throwing the ribbon vibrator out of operation, as for doing mimeograph work, and various other improvements in the ribbon mechanism.

My invention consists of certain features of construction and combinations and arrangements of parts, all of which will be fully set forth herein and particularly pointed out in the claims.

Figure 1:
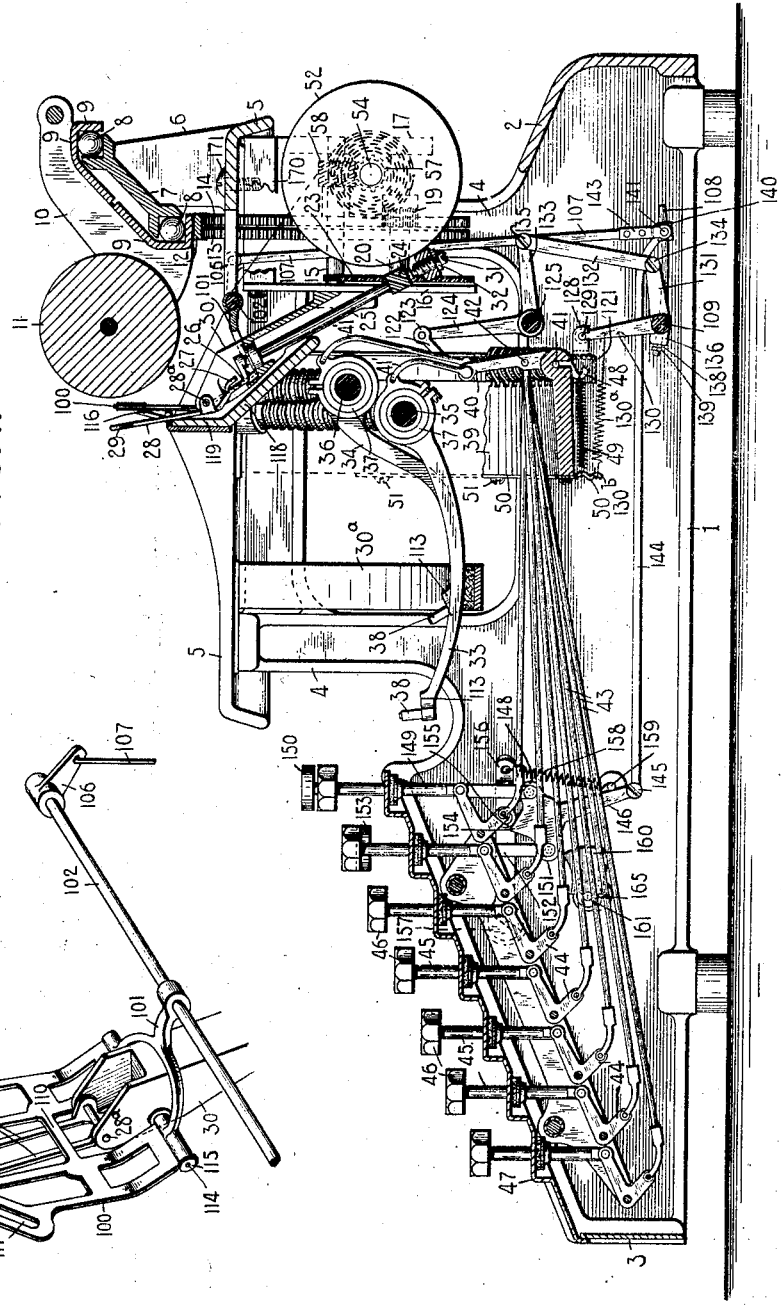
Figure 2:
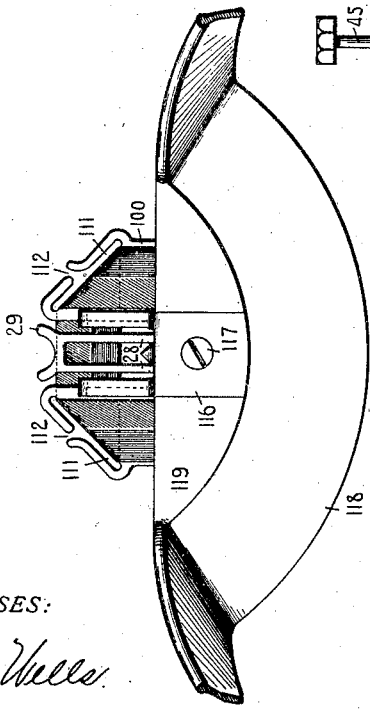
Figure 3:
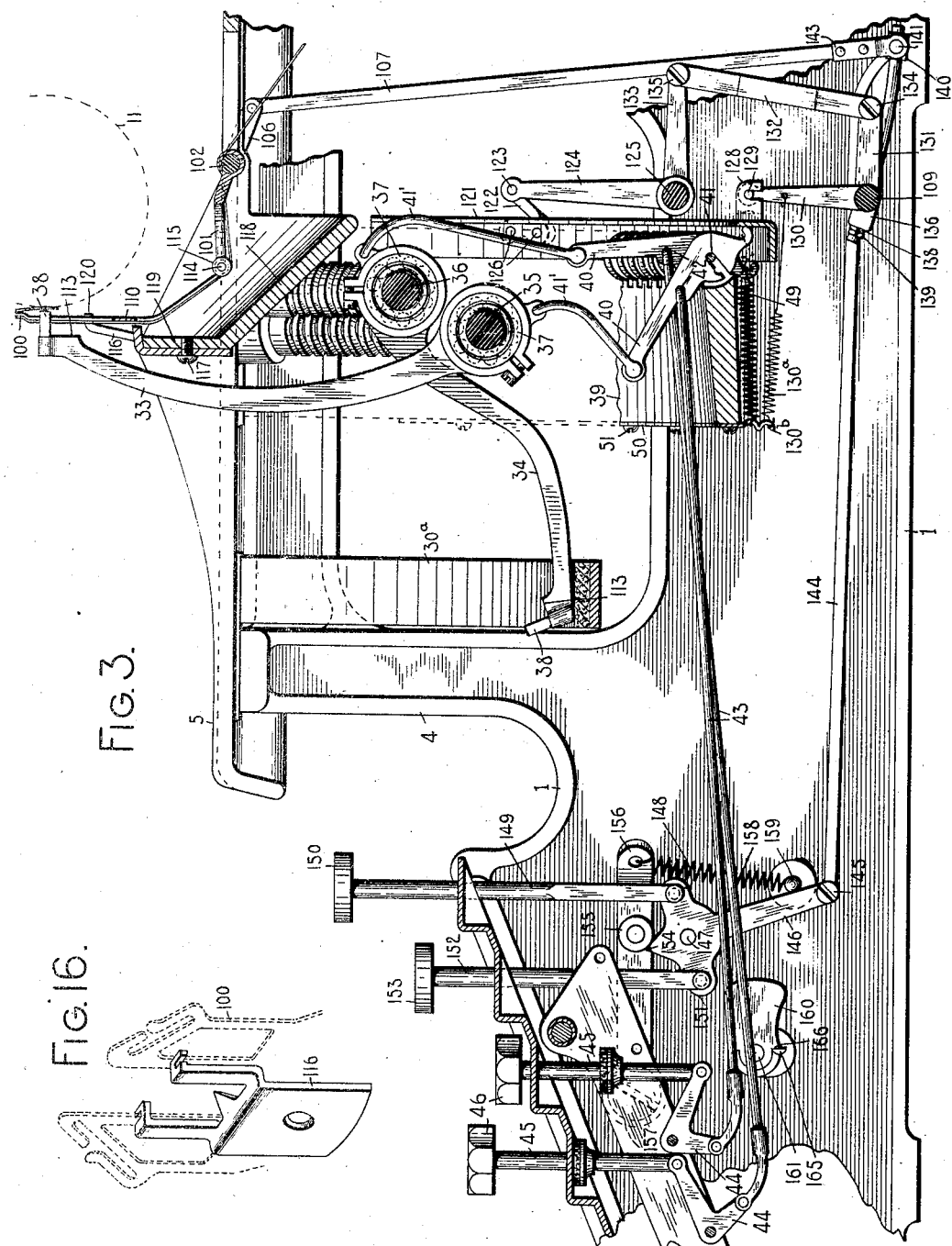
Figure 7:
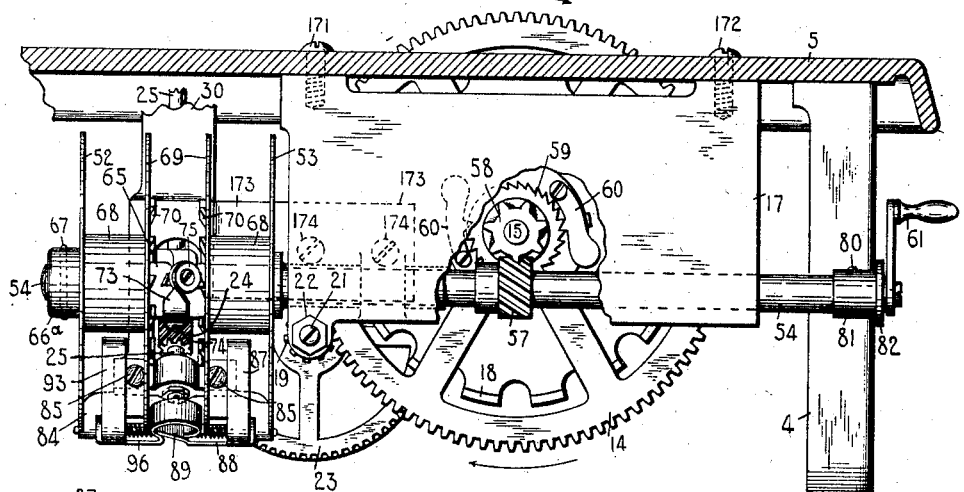
Figure 8:
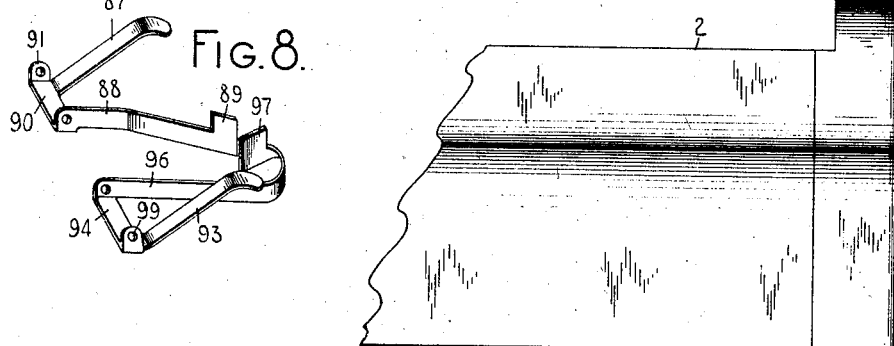
Figure 9:
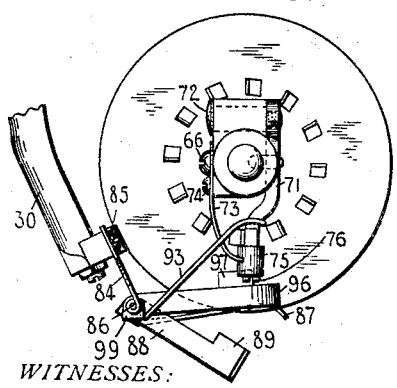
Figure 10:
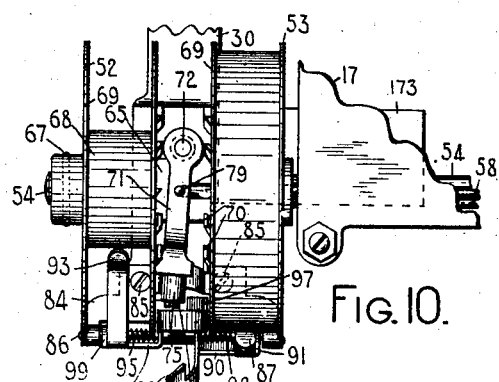

My invention is illustrated in the accompanying drawings, in which, Figure 1 is a front to rear vertical sectional view of a typewriting machine having my invention embodied therein. Fig. 2 is a view similar to Fig. 1 but omitting some of the parts shown in Fig. 1 and showing other parts not shown in said figure. Fig. 3 is a view similar to Fig. 1 but on a larger scale and showing the parts in other positions. Fig. 4 is a fragmentary view somewhat similar to Fig. 3 but partly on a different section and showing the parts in other positions. Fig. 5 is a front view of the ribbon vibrator and its operating mechanism, the main frame of the machine being shown in section. In this figure the base portion of the main frame is shown in section through the keyboard and the top plate on the vertical plane of the axis of the shaft that operates the ribbon vibrator. Fig. 6 is a fragmentary top view, partly in section, of a part of the vibrator operating mechanism. Fig. 7 is a fragmentary rear view of part of the machine showing the ribbon spools and parts associated therewith. Fig. 8 consists of per-
spective views of the ribbon controlled devices for effecting an automatic reverse of the feed of the ribbon. Fig. 9 is a fragmentary view from the left-hand side of Fig. 7, one of the ribbon spools being removed. Fig. 10 is a fragmentary rear view showing the ribbon spools and parts immediately associated therewith. Fig. 11 is a view similar to Fig. 7 but with the parts in a different position and with some of the parts shown in said Fig. 7 omitted. Fig. 12 is a fragmentary vertical sectional view on a plane half way between the two ribbon spools. Fig. 13 is a top view of parts shown in Fig. 7, in section on a horizontal plane through the axis of the ribbon spools. Fig. 14 is a fragmentary view of the ribbon vibrator and parts adjacent thereto, as seen from the front of the machine. Fig. 15 is a perspective view of the rear side of the ribbon vibrator, the universal bar and the parts associated therewith. Fig. 16 is a perspective view of the guide for the ribbon vibrator.

In all of the views parts are shown in section and parts are omitted or broken away as has been found convenient.

Some of the features of my invention are applicable to typewriting machines generally and others are more especially applicable to front-strike typewriters, and I have accordingly shown my invention applied to a machine of the latter class.

The main frame of the machine shown in the drawing comprises side plates 1, which are connected together at their rear ends by a back plate 2, and at their forward ends by a front plate 3. Said side plates are provided or formed with posts 4, which support the top plate 5, and posts or brackets 6 rising from said top plate, support a stationary carriage rail 7, said rail being inclined upward and toward the back of the machine. The rail 7 has its opposite edges grooved to form ball races in which run anti-friction balls or rollers 8, that coöperate with rails 9, forming part of a carriage, which carriage also comprises end pieces 10, in which is journaled the shaft of a platen 11. A feed rack 12 is secured to the under side of the lower carriage rail 9, and said feed rack is engaged by two gears 13 and 14, both loosely mounted on a shaft 15 that is journaled in a casing secured to the underside of the top plate 5. Said casing comprises a front plate 16 and a rear plate 17 in which plates the shaft 15 is journaled at its ends. The carriage is drawn in letter space direction by a spring 18ª coiled within a drum or barrel 18, one end of said spring being connected with the gear wheel 13 and the other with a relatively stationary part of the machine. The step-by-step feed of the carriage is controlled by an escapement mechanism that is geared to the wheel 14. For most of the purposes of the present invention, said escapement mechanism may be of any suitable description. As shown in the present instance, the gear wheel 14 meshes with a pinion 19 that is loosely mounted on a shaft 20 that is journaled at its ends in the frame plates 16 and 17 or on pivot-pins or screws secured to said plates. As shown in the present case, said shaft is journaled on the reduced ends of screws 21, threaded through the plates 16 and 17 and secured in adjusted position by lock nuts 22. Means (not shown) are provided for causing the shaft 20 to turn with the pinion 19 when the carriage is moving in letter space feed direction, but leaving said pinion free to turn on said shaft when the carriage is moved toward the right. Near its forward end the shaft 20 has mounted thereon a gear wheel 23 having skew teeth that mesh with a skew pinion 24 mounted on a shaft 25 that is inclined upward and forward and has an eccentric tooth 26 mounted on its upper end and adapted to engage feed dogs 27, mounted on the lower end of an arm or lever 28, the upper end of which is formed into an arc-shaped universal bar 29 that is adapted to be struck by the free ends of the type bars when said type bars are thrown to printing position. The lever 28 is pivoted at 28ª to the upper end of a bracket or frame 30, the lower end of which is secured to the frame plate 16. The upper end of the shaft 25 is suitably journaled in the bracket 30 and the lower end of said shaft is journaled on the reduced end of a screw 31, that is threaded through an ear 32 of said bracket 30. The construction is such that when the universal bar 29 is operated the shaft 25 makes a complete rotation and the connections between said shaft and the feed rack 12 are so proportioned that a complete rotation of the shaft 25 allows the carriage to move a letter space distance. The carriage feed mechanism here shown and briefly described is not claimed herein, but is claimed in my application filed Dec. 10th, 1906, Serial No. 347,104.

The typewriting machine comprises two sets of type bars 33 and 34 mounted respectively on segments 35 and 36, the latter being of less radius than the former and mounted somewhat nearer the back of the machine. The segments 35 and 36 are each circular in cross section and each of them is formed with a series of peripheral grooves that constitute ball races, there being one ball race for each type bar. Anti-friction balls running in said grooves coöperate with corresponding grooves formed by rings 37 which surround said segments and are set in eyes formed in the pivotal ends of the type bars. The ball bearing referred to is not shown nor described herein in detail, as the precise construction thereof is not material to the present invention. The grooved type bar segments 35 and 36 are each secured at their ends to the under side of the top plate 5. Each of the type bars 33 and 34 has a type 38 mounted on its free end. The type bars normally rest on a pad or cushion 30ª, secured at its ends to the top plate 5.

Below the segments 35 and 36 there is mounted a sub-lever segment 39 of greater radius than either of the type bar segments, but preferably concentric with said segments. The segment 39 is formed along its rear edge with a series of radial slots equal in number to the type bars 33 and 34 and in said slots there are mounted sub-levers 40 that extend radially of the segment, said sub-levers being pivoted on a pivot wire 41 seated in a transverse slot in the segment 39. Each of the sub-levers 40 has pivoted to its inner end a link 41, the inner end of which is pivoted to the heel of one of the type bars. Each of the sub-levers has pivoted thereto at 42 intermediate its ends a forwardly extending link 43, the forward end of which is pivoted to one arm of an angular lever 44 to the other arm of which is pivoted the stem 45 of a finger-key 46. The angular levers 44 are arranged in a plurality of rows corresponding to the transverse rows of keys, seven of said rows being shown in the present instance. The key stems 45 pass through suitable openings in a keyboard plate 47. Each of the sub-levers 40 has a heel 48 that forms a hook outside or below the segment 39 and to said hook is connected one end of a returning spring 49, the forward end of which is connected to one of the teeth of a toothed plate 50 that is secured to the front edge of the segment 39 by screws 51. The construction is such that if any type-key be depressed the link 43 corresponding thereto will be drawn toward the front of the machine and the corresponding sub-lever 40 will be rocked toward the front of the machine and the corresponding type bar will be thrown to the printing point as shown in Fig. 3. The type bar actuating mechanism herein shown and briefly described is not of my invention, but is the invention of John H. Barr.

The ribbon spools 52 and 53 are mounted side by side in the rear of the machine below the top plate and back of the type bar segments; and the ribbon is led from said spools to a ribbon vibrator in front of the printing point. Said spools are mounted coaxially with and are driven by a transverse driving shaft 54 that is journaled in a plate 55 forming the left-hand end of the casing which comprises the frame plates 16 and 17 and also in a lug 56 projecting from said frame plate 17. In the present instance the ribbon spools are mounted on said shaft. The shaft 54 lies beneath the rear part of the shaft 15 from which it is driven by skewed gears 57 and 58, the former of which is rigidly mounted on the shaft 54 and the latter of which is loosely mounted on the shaft 15 and has rigidly connected thereto a ratchet wheel 59 that is engaged by a pawl 60 pivoted on the rear face of the gear wheel 14. The construction is such that when the carriage is moving toward the left the shaft 54 is turned toward the back of the machine, but when the carriage is moving toward the right the pawl 60 moves over the teeth of the ratchet 59. The shaft 54 projects toward the left from the casing in which it is journaled and has mounted on its free end a crank handle 61 by means of which said shaft may be turned by hand. Endwise motion of the shaft 54 is prevented by a collar 62 secured to said shaft and engaging the left hand side of the lug 56 and by another collar 63 also secured on said shaft and engaging the other side of said lug. Said collar 63 is formed with a flange 64 that prevents motion of the spool 53 axially toward the left. The ribbon spools are mounted on a sleeve or collar 65 which in turn is mounted on the shaft 54 and rigidly secured thereon by a set screw 66 threaded through said sleeve 65 and engaging said shaft. The sleeve 65 is of greater thickness in its middle portion than in its end portions and the spool 53 is loosely mounted on said collar between the enlarged middle portion of the collar on the one side and the flange 64 on the other. The spool 52 is mounted on the other end of the collar which is similarly reduced and the latter spool is held in position by a collar 66ᵃ mounted on the end of the shaft 54 and secured in position by a pin 67 passing through the collar and the shaft. The ribbon spools may be of any suitable construction but as here shown they are formed of sheet metal and each of them comprises a core or a drum portion 68 and two flanges 69. In order to operatively connect one of the ribbon spools at a time with the driving shaft 54 each of said spools has formed on the face of one of the flanges a series of ratchet teeth 70, said teeth being formed in the present instance by stamping out the metal of the flange. The teeth 70 are adapted to be engaged by a pivoted dog 71 that is mounted on a shouldered pivot screw 72 that passes through the enlarged middle part of the collar 65 and is threaded into the dog 71, thus affording a long pivot for said dog. Said dog 71 is so positioned that it may be slightly rocked about its pivot and into either one of two positions in one of which it engages the teeth of the spool 53 and in the other of which it engages the teeth of the spool 52, so that one of the spools is always connected with the driving shaft and the other of the spools is always disconnected from said shaft. In order to retain the dog 71 in either of its positions, I provide a plate spring 73 that is secured to the enlarged middle portion of the collar 65 on the opposite side thereof from the dog 71 by means of the set screw 66 and of another headed screw 74. The free end of the spring 73 is bent into the path of an anti-friction roller 75 that is mounted on a screw 76, threaded into the end of the dog 71, and the end of said spring is pointed, the point extending midway between the two ribbon spools. The construction is such that when the dog 71 is in engagement with either of the spools the roller 75 is on one side of the point of the spring 73 and the tension of said spring tends to press the dog into engagement with the ribbon spool.

I provide hand operated means and also automatic ribbon controlled means for shifting the dog 71 to reverse the feed of the ribbon. The hand operated means for this purpose comprises a slide rod 78 that is seated in a longitudinal slot in the shaft 54 which slot also registers with a slot in the sleeve 65. The slide rod 78 extends to a point beneath the dog 71 and its free end is bent up as shown at 79 and passes through a hole in the dog. The other end of the rod 78 extends beyond the frame plate 55 and is bent up as shown at 80, the bent up end passing through a hole in a collar 81 having a milled flange 82 and loosely mounted on the shaft 54. The construction is such that the dog 71 may be shifted to either of its positions by shifting the collar 81 to the right or to the left by hand.

The automatic ribbon controlled means for shifting the dog 71 comprises two ribbon controlled cams which are adapted to be moved one at a time into the path of the roller 75 and to cam said roller and with it the dog 71 in one direction or the other. There is one of these cams for each of the ribbon spools and said cams are pivotally mounted on a plate or bracket 84 that is secured by screws 85 to the lower end of the bracket 30 that supports the escapement mechanism. The lower edge of the plate 84 is of a width substantially corresponding to the entire width of both spools and said edge is bent as shown in the drawings to support a pivot rod 86 on which the ribbon controlled devices are pivoted, the plate 84 having two cutaway portions one to accommodate each of said pivoted devices. As here shown, said pivoted ribbon controlled devices are formed of sheet metal. That device which coöperates with the spool 53 has an arm 87 that extends between the flanges of the spool 53 and is adapted to be pressed against the ribbon wound on said spool. Said device also comprises an arm 88 that is adapted to enter the space between the two ribbon spools and the free end of which is formed into a cam 89. The arm 88 is bent in such fashion as to bring the cam 89 into the path of the roller 75 and when in such position said cam is inclined toward the front of the machine and toward the left. The construction and arrangement are such that when the spool 53 has a number of turns of ribbon wound about it the arm 87 holds the cam 89 below the path of the roller 75 but when the ribbon is about exhausted from the spool said cam moves up to a position where it is struck by the roller 75 and cams said roller toward the left until the roller has passed the point of the spring 73 when it is moved by said cam and said spring into engagement with the spool 53. The arms 87 and 88 are connected by a yoke-piece 90 from which an ear 91 is bent up. Said ear 91 and the arm 88 have openings through which the pivot rod 86 passes, whereby this device is pivoted to said rod. The arms 87 and 88 are normally pressed upward by a spring 92 that is coiled about the rod 86 and at one end presses against the plate 84 and at the other end presses against the yoke-bar 90.

The pivoted ribbon controlled device that coöperates with the spool 52 is similar in a general way to the one just described but with certain differences which will be pointed out. Said device comprises an arm 93 that projects from a yoke-piece 94 and is adapted to be pressed by a spring 95 into engagement with a ribbon coiled on the spool 52. An arm 96 projects from the yoke-piece 94 into the space between the two ribbon spools and the free end of said arm is made longer than the arm 88 and is curved or bent back on itself, the curve or bend passing around the free end of the arm 88 and having a cam 97 formed on its extreme end. The cam 97 is inclined in the opposite direction from the cam 89, that is to say, it is inclined toward the front of the machine and toward the right, so that when this cam comes into the path of the roller 75 said roller will be cammed toward the right, thus bringing the dog 71 into engagement with the spool 52. This device is also pivoted on the rod 86 which passes through the arm 96 and through an ear 99 bent up from the end of the yoke-piece 94. It will be perceived that since both of the pivoted devices are mounted on the same pivot rod 86, if the arm 96 were bent in the same manner as the arm 88, there would come a time in the operation of the machine when the two arms would interfere and it is to avoid this interference that the arm 96 is bent entirely around the free end of the arm 88, so that when the parts are in the position shown in Fig. 7 the arm 88 is nested in the arm 96. This special provision would obviously be unnecessary if the two pivoted devices were mounted at some distance apart as, for example, if one of them were mounted below its ribbon spool as at present and the other were mounted above its ribbon spool. It will be understood that at no time in the operation of the machine are both of the cams in position to be engaged by the roller 75 as both of the spools are never empty at the same time. In Fig. 8 both of the pivoted devices are shown in perspective but they are shown a little farther apart than they are in the machine for the sake of clearness. In practice the cam 89 comes up between the cam 97 and the arm 96 as more clearly shown in Fig. 7.

I provide a ribbon vibrator 100 at the printing point. Said vibrator is hinged to the forward end of an arm or arms 101 projecting toward the front of the machine from a rock shaft 102 that lies in a transverse slot in the top plate 5 and the reduced ends 103 of which are journaled in small blocks 104 seated in suitable depressions in the top plate and secured in position by screws 105 passing through said blocks and threaded into said top plate. The rock shaft 102 extends to the left hand side of the machine where it has projecting rearwardly therefrom an arm 106, the free end of which is pivoted to the upper end of a link 107, the lower end of which is connected with an arm 108 projecting toward the rear of the machine from a rock shaft 109 that is operable by any of the keys through the instrumentality of a universal bar mechanism which will hereinafter be described.

The ribbon vibrator 100 is preferably made of sheet metal and, as seen from the front, it has in a general way the outline of the letter "H," the two upright parts thereof being connected by a cross piece 110. The upper end of each of the vertical portions of the vibrator is formed with an oblique slot 111 having an opening 112 for threading the ribbon through. The lower half of each of the vertical portions of the vibrator is bent at an inclination toward the rear of the machine, as shown in Fig. 1, and at its lower end is hinged to one branch of the forked arm 101. This arm is forked in order to embrace the bracket 30 in which the escapement mechanism is mounted, and said bracket is also straddled by the lower part of the ribbon vibrator. The lever 28 extends up in front of the ribbon vibrator and has its upper end curved to form substantially a semi-circle, the type 38 striking the ribbon substantially at the center of said semi-circle and an abutment or contact portion 113 formed on each of the type bars striking and operating the universal bar. The connections between the branches of the arm 101 and the ribbon vibrator are in the nature of hinges, the lower ends of the two branches of the vibrator being bent around pivot pins 114 and said pins being provided with broad washers 115. Said ribbon is led from the spools up over the shaft 102 and under the hinges referred to, the washers 115 serving to hold it in place, and thence upward along the front faces of the two vertical portions of the vibrator and through the inclined slots 111, passing in front of the printing point in a horizontal direction. The ribbon vibrator is supported and guided at its lower end by its hinged connection with the arm 101 and at its upper end it is guided by a guide bracket 116 secured to the top plate by a screw 117. The top plate 5 is formed in its forward middle part with the usual well or opening up through which the type bars strike and the rear of said opening is closed by a dust guard 118 which may be secured to, but is preferably formed integral with, the top plate. Said dust guard has the form of a segment of a frustum of a cone, which slopes downward and toward the rear of the machine and substantially covers the bearings of the several type bars, and also of the sub-levers, protecting them from dust, especially that caused by erasures made on the machine. The arm 101 and the lower part of the ribbon vibrator are above and behind this dust guard. At the forward edge of the conical portion of the dust guard 118 there is a vertical portion 119, the top edge of which is substantially straight and horizontal and the lower edge of which is in the arc of a circle so that said vertical portion 119 has substantially the form of a segment of a circle. This dust guard is not of my invention but is the invention of A. J. Briggs. It is to the front face of the vertical portion 119 of the dust guard that the guide 116 is secured. The upper part of said guide is forked, thus leaving two upstanding arms each of which is bent at its upper end toward the back of the machine, as shown at 120, and is formed on its outer edge with a slot in which the inner edge of the vertical portion of the vibrator slides up and down. It will be perceived that the arrangement is such as to accurately guide the upper end of the ribbon vibrator. If the ribbon is connected to both spools, it may be threaded through the ribbon vibrator without loosening either end of the ribbon by drawing the loop of the ribbon to the vibrator, inserting it into the slots 111 through the openings 112, and then catching the ribbon down under the hinges at the lower end of the vibrator.

The ribbon vibrator normally stands with its upper edge below the printing point and it is raised upon each actuation of a typekey so that the ribbon covers the printing point. It will be perceived that when the vibrator is thus elevated, the portion of the ribbon that touches the shaft 102 and also the portions of it that touch the hinges between the arm 101 and the vibrator, are made less so that the tension on the ribbon is decreased when the ribbon is at the printing point. As the feed of the ribbon takes place between successive strokes of the type bars, the ribbon is put under slight tension at each step of the ribbon spool but this tension is lessened when the ribbon is thrown to the printing point to be struck by the type. This is an advantage because, if the ribbon is too tightly stretched across the printing point, it interferes seriously with the printing, and also makes a perceptible difference in the touch on the keys.

The rock shaft 109, to which the ribbon vibrator is operatively connected, is operated by an arc-shaped universal bar 121 that lies behind the heels 48 of the sub-levers 40. The universal bar 121 is angled or L-shaped in cross-section, as shown, for the sake of stiffness, the vertical portion of the bar standing behind the heels of the sub-levers in position to be moved by the heel of a sub-lever toward the back of the machine when any one of the keys is operated. Near each of its ends said universal bar has rigidly mounted thereon and projecting toward the rear of the machine therefrom an arm 122 that is pivoted at 123 to an upstanding arm 124 rigidly mounted on a rock shaft 125 that is pivoted or journaled at its ends in the frame plates 1 some distance above the rock shaft 109. The arms 122, as here shown, are secured to the universal bar by rivets 126. The rock shafts 109 and 125 may, of course, be pivotally mounted in any suitable manner but as here shown, they are pivoted on the reduced inner ends of screws 127 that are threaded through the side plates 1. At or near its middle, the universal bar 121 has projecting therefrom toward the rear of the machine an arm or bracket 128, formed on its under side with a vertical slot into which a pin 129 projects from the free end of an upstanding arm 130, rigidly mounted on the rock-shaft 109. Near one side of the machine, the shaft 109 has projecting therefrom a substantially horizontal arm 131, the free end of which is connected by a link 132 with an arm 133 projecting from the shaft 125. Said link 132 is pivoted at its ends on shouldered and headed screws 134 and 135 threaded into the arms 131 and 133, respectively. The arms 124 and 133, and 130 and 131 are so proportioned as to cause all points of the universal bar 121 to move parallel to one another and for the same distance, so that any one of the sub-levers 40 will impart to the ribbon vibrator the same extent of motion as any other. I prefer to mount the universal bar so that it normally stands a short distance behind the heels 48 of the sub-levers, so that said universal bar is not taken up until after the type bar has been set in motion and has acquired some momentum. Any suitable spring may be provided for returning the ribbon vibrator and its operating mechanism to normal position. As here shown, these parts are restored by a spring 130ª, connected at its rear end to the arm 130 and at its forward end to a bracket 130ᵇ, secured by screws to the forward edge of the sub-lever segment 39. Any suitable means may be provided for arresting these parts in their normal positions. The means here shown consists of one or more pads or cushions 121ª of felt or other suitable material, secured to the segment 39 in position to arrest the universal bar 121. Said pad may be secured in position by a sheet metal cap 121ᵇ that covers the felt pad and that is secured to the segment by screws 121ᶜ. One of these arresting members may be placed at each end of the universal bar in which positions they are out of the way of the springs 49.

In order to vary the extent of throw imparted to the ribbon vibrator 100, I provide means for changing the connections between the universal bar 121 and the vibrator so that said universal bar when operated may cause the vibrator to move high enough for the type to strike the lower part of the ribbon or only high enough for said type to strike the upper part of the ribbon as may be desired; and also for still further varying said connections so that the ribbon vibrator is not operated at all, but remains below the printing point. The last mentioned adjustment is useful in case it is desired to do mimeograph work on the typewriter. I effect these changes in the relation between the universal bar and the ribbon vibrator by moving the pivotal connection between the link 107 and the arm 108 different distances from the axis of the shaft 109, the last mentioned adjustment being that in which the longitudinal axis of the link 107 substantially passes through the axis of said shaft 109. As shown in the present instance, I have so arranged the parts that said pivotal connection between the link 107 and arm 108 is substantially in the axis of the shaft 109. In order to make this possible, said shaft 109 is bent toward the front of the machine, as shown in Fig. 6, leaving a cut-away portion into which the pivotal connection with the link 107 may be moved, so that when the shaft 109 is rocked substantially no motion at all will be imparted to the link 107. As will be seen from the drawings (see Fig. 6), the extreme left-hand end of the shaft 109 resembles a bail having a yoke-piece 136 and a rearwardly extending arm 137 into an axial opening in which the reduced end of the pivot pin 127 projects. The arm 108 consists of a rod having its forward end reduced and passing through the yoke-piece 136, said rod being secured in position by a nut 138 threaded on to the end thereof, and a lock nut 139. The arm 108 is curved downwardly, as shown, substantially into the form of an arc having its center at the upper end of the link 107, so that said link may be moved back and forth along said arm without affecting the shaft 102. The pivotal connection between the link 107 and the arm 108 comprises a block or pivot piece 140 having an opening adapted to receive the arm 108 and having on its right and left-hand sides trunnions 141 and 142, on the latter of which the link 107 is pivoted and on the former of which is pivoted a spring plate 143 secured to the side of the link 107 by any suitable means, as, for example, by rivets. Pivoted on the trunnion 142 is the rear end of a forwardly extending link 144, the forward end of which extends to a point beneath the left-hand side of the keyboard where it is pivoted on a shouldered and headed screw 145 threaded into the depending arm 146 of a cross-shaped lever that is pivoted at 147 to the left-hand side plate 1. Said cross-shaped lever has a rearwardly extending arm 148 to which is pivoted the lower end of a key stem 149 that extends upward through the keyboard plate 47 and has a key 150 on its upper end. Said lever also has a forwardly extending arm 151 to which is pivoted the stem 152 of a key 153. Said lever has also an upwardly extending arm 154 that is pointed at its upper end and coöperates with a pin or roller 155 mounted on one side of a lever 156 that is pivoted on a shouldered and headed screw 157 threaded into the side plate 1. At its free end the lever 156 is drawn downwardly to force the pin or roller 155 into engagement with the pointed arm 154 by a spring 158 connected at one end to said lever and at the other end to a stop-pin 159 projecting from the side plate 1. Said stop-pin 159 serves to limit the motion of the lever 146 when said lever is moved toward the rear of the machine, and, as will be seen from the drawings, when said lever arm is in engagement with said stop pin it is pressed into engagement therewith by the pin or roller 155. The motion of said lever arm toward the front of the machine is normally limited by a stop 160 consisting of an arm rigidly mounted on a short shaft 161 that passes loosely through a boss on the side plate 1 and projects to the outside of said side plate where it has rigidly mounted thereon a milled head or finger piece 162 by manipulation of which said stop may be turned either to the position shown in Fig. 3 where it is in position to arrest the arm 146, or to the position shown in Fig. 4 where it is out of coöperative relation with said lever arm. The arm 160 is arrested in either of its two positions by a stop pin 165 projecting inward from the side plate 1 in position to be engaged by two shoulders 166 and 167 formed on said arm 160.

The construction is such that the arm 146 and the parts connected therewith have three different positions: an extreme rear position when said arm 146 is in engagement with the stop 159 and the key 153 is depressed, an extreme forward position when the stop 160 is in its forward or inoperative position and the key 150 is depressed, and an intermediate position when the stop 160 is in its rearward or operative position and the key 150 is depressed. In the first of these positions of the arm 146, the pivot piece 140 will be near the rear end of the arm 108 and at its greatest distance from the axis of the shaft 109, so that the greatest extent of motion will be imparted to the ribbon vibrator and the writing will be done with the lower part of the ribbon in use. When the arm 146 is in its intermediate position said pivot piece will be at a less distance from the axis of the shaft 109 and a less extent of motion will be imparted to the ribbon vibrator with the result that the types will strike the upper part of the ribbon; and when the arm 146 is in its extreme forward position the pivot piece 140 will be close to the yoke-piece 136 and the axis of the trunnions 141 and 142 will substantially coincide with the axis of the shaft 109, so that the ribbon vibrator will not be operated but will remain in its depressed or inoperative position. As will be apparent, the lever 146 may be operated in either direction by depressing the appropriate key 150 or 153. If the key 150 be already in its depressed position, the arm 146 may be moved to its extreme forward position by turning the finger piece 162 toward the front of the machine, thus bringing the arm 160 to its inoperative position when the cross-shaped lever will be moved back to its extreme forward position by the spring 158 acting through the lever 156 and the pin or roller 155. In Fig. 6 the extreme rearward position of the pivot piece 140 is shown in full lines and its other two positions are indicated by dotted lines. This mechanism is adapted for use with a two-color ribbon. In Fig. 14, I have shown a ribbon having two longitudinal stripes, the upper one being black and the lower one red, although it is obvious that the two halves of the ribbon may differ in some other respect. For example, one stripe may be copying ribbon and the other record ribbon. If, in the case here shown, the key 150 be depressed, the types will strike the black stripe of the ribbon, and if the key 153 be depressed they will strike the red stripe, and these keys may be marked accordingly in any suitable manner. For example, the upper surface of key 150 may be made black and that of the key 153 red. In case a one-color ribbon is employed the keys 150 and 153 are utilized to secure a uniform wear on the ribbon, the operator taking care to have each one of them depressed part of the time, so that both the upper and lower parts of the ribbon are brought into use.

The framework in which the carriage driving mechanism, the escapement mechanism and the ribbon spool mechanism are all mounted, is detachably secured to the top plate 5 in such fashion that in the process of manufacture this entire mechanism may be assembled outside of the machine and may be inserted into the machine as a whole; and these parts may also be removed from the machine at any time as an entirety for the purpose of repairs or for any other purpose. The plates 16 and 17 are connected together at their left-hand ends by the plate 55 and at their right-hand ends by a cross piece 170. This framework is secured to the top plate by two screws 171 and 172 passing through the top plate 5 and threaded into the cross pieces 170 and 55, respectively. The bracket 30 on which the escapement mechanism and the ribbon reversing mechanism are mounted is secured to the plate 16 in the manner best shown in Fig. 7. The lower part of said bracket consists of a plate or arm 173 that is secured to the frame plate 16 by screws 174. Said plate 173 projects toward the right from the plate 16 and the upstanding portion of the bracket 30 is situated just in front of the ribbon spools, having its center about midway of the two spools. In assembling the machine this entire framework is inserted from the rear beneath the top plate, the universal bar 29 and the upper end of the bracket 30 passing up between the branches of the arm 101 and between the lower branches of the ribbon vibrator 100 and beneath the cross piece 110 of said ribbon vibrator, and the parts are secured in place by inserting and fastening the screws 171 and 172. This mechanism may obviously be detached from the machine by reversing this process. It will be perceived that the entire ribbon-driving mechanism, including not only the spools and the driving shaft 54 on which they are mounted, but also the driving spring and the escapement mechanism by which the longitudinal feed of the ribbon is controlled, the hand operated reversing device and the automatic reversing device, is included in the mechanism that may thus be removed as an entirety from the machine.

Various changes in the details of construction and arrangement may be made without departing from my invention.

What I claim as new and desire to secure by Letters Patent, is:—

1. In a typewriting machine, the combination of a ribbon vibrator, an actuating device connected therewith, and a rocking member operative on said actuating device, said device being movable into and out of operative relation to said rocking member while the vibrator is away from the printing point.

2. In a typewriting machine, the combination of a ribbon vibrator, an actuating member connected therewith, and a rocking member adapted to actuate said actuating member, one of said members being movable to render the rocking member inoperative to actuate said actuating member while the vibrator is away from the printing point.

3. In a typewriting machine, the combination of a ribbon vibrator, a rocking member for operating said ribbon vibrator, and a connection between said rocking member and said vibrator, said connection including a part that is movable substantially to the axis of said rocking member whereby said rocking member is rendered inoperative to actuate the vibrator.

4. In a typewriting machine, the combination of a ribbon vibrator, a link for operating said ribbon vibrator, and a rocking member for operating said link, said link being movable to different positions in which its longitudinal axis bears different relations to said rocking member, one of said positions being such that the longitudinal axis of said link substantially passes through the axis of said rocking member so that said ribbon vibrator is not operated by said rocking member.

5. In a typewriting machine, the combination of a ribbon vibrator; a link for operating said ribbon vibrator, a rocking member for operating said link, an arm on said rocking member, said arm extending across the axis of said rocking member; a sliding connection between said link and said arm, and means for moving said sliding connection to different positions along said arm, one of said positions being such that the longitudinal axis of said link substantially passes through the axis of said rocking member.

6. In a typewriting machine, the combination of a ribbon vibrator, a link for operating said ribbon vibrator, a rock shaft for operating said link, said rock shaft being bent or cut away so as to leave an open space reaching to the axis of said shaft, and an arm on said shaft extending across said open space, said link being slidably connected with said arm.

7. In a typewriting machine, the combination of a ribbon vibrator, a link for operating said ribbon vibrator, a rocking member, a pivot piece pivotally connected with said link and slidably connected with said rocking member, and hand operated means connected with said pivot piece for sliding it toward or from the axis of said rocking member.

8. In a typewriting machine, the combination of a ribbon vibrator, a link for operating said ribbon vibrator, a rocking member, a pivot piece pivotally connected with said link and slidably connected with said rocking member, a link connected with said pivot piece for sliding it toward or from the axis of said rocking member, and key mechanism at the front of the machine controlling said link.

9. In a typewriting machine, the combination of a ribbon vibrator; a link for operating said ribbon vibrator; a rocking member having an arm with which said link is pivotally connected; means for moving said link to different points along said arm, one of said points being substantially in the axis of said rocking member; printing instrumentalities; and means for rocking said rocking member upon each actuation of said printing instrumentalities.

10. In a typewriting machine, the combination of a ribbon vibrator; a link for operating said ribbon vibrator; a rocking member; a pivotal connection between said rocking member and said link; means for moving said pivotal connection to different distances from the axis of said rocking member and also for moving said pivotal point substantially to the axis of said rocking member; and means for rocking said rocking member.

11. In a typewriting machine, the combination of a ribbon vibrator; a link for operating said ribbon vibrator; a rocking member having an arm that is curved substantially in the form of an arc having one end of said link as its center; a pivotal connection between the other end of said link and said curved arm; means for moving said pivotal connection to different positions along said arm; and means for rocking said rocking member.

12. In a typewriting machine, the combination of a ribbon vibrator; a link for operating said ribbon vibrator; a rock shaft having an arm with which said link is pivotally connected; means for moving said pivotal connection to different points along said arm, said points including a point substantially in the axis of said arm; and means for oscillating said rock shaft.

13. In a typewriting machine, the combination of a ribbon vibrator; means for operating said ribbon vibrator; and means for varying the operation of said ribbon vibrator, said means including a lever movable to different positions, stops for arresting said lever in a plurality of positions, spring means for holding said lever against either of said stops, and means for moving one of said stops so as to afford to said lever a motion to an additional position.

14. In a typewriting machine, the combination of a ribbon vibrator; means for operating said ribbon vibrator; and means for varying the operation of said ribbon vibrator, said means including a member movable to different positions, stops for arresting said member in a plurality of positions, spring means for holding said member against either of said stops, and means for moving one of said stops so as to afford to said member a motion to an additional position.

15. In a typewriting machine, the combination of a ribbon vibrator; means for operating said ribbon vibrator; and means for varying the operation of said ribbon vibrator, said means including a movable member, two keys adapted to move said member in opposite directions; two stops for arresting the motion of said member, spring means for pressing said member against either of said stops, and means for moving one of said stops so as to afford to said member a movement to a third position.

16. In a typewriting machine, the combination of a ribbon vibrator; means for operating said ribbon vibrator; and means for varying the operation of said ribbon vibrator, said means including a lever, two keys adapted to move said lever in opposite directions, two stops for arresting the motion of said lever, spring means for pressing said lever against either of said stops, and means for moving one of said stops so as to afford to said lever a movement to a third position.

17. In a typewriting machine, the combination of a ribbon vibrator, means for operating said ribbon vibrator, and means for varying the operation of said ribbon vibrator including a part movable to different positions, a lever for controlling said part, two keys operative on said lever on opposite sides of its pivot, two stops for arresting said lever, a spring arranged to press said lever against either of its stops, and means for moving one of said stops so as to permit said lever to be moved to a third position.

18. In a typewriting machine, the combination of two ribbon spools mounted side by side, a pawl mounted between said ribbon spools and pivoted to be swung into driving engagement with either one of said spools, the pivot of said pawl being so disposed that when said pawl is swung from one spool to the other its operative end moves in a path approximately parallel with the axis of said spools, means for rotating said pawl about the axis of said spools, and means for shifting said pawl from one of said spools to the other to reverse the feed of the ribbon.

19. In a typewriting machine, the combination of two ribbon spools mounted side by side, a pawl mounted between said ribbon spools and pivoted to be swung into driving engagement with either one of said spools, the pivot of said pawl being so disposed that when said pawl is swung from one spool to the other its operative end moves in a path approximately parallel with the axis of said spools, means for rotating said pawl about the axis of said spools, means for shifting said pawl from one of said spools to the other to reverse the feed of the ribbon, and spring means for retaining said pawl in either of its positions.

20. In a typewriting machine, the combination of two ribbon spools mounted side by side, a pawl mounted between said ribbon spools and pivoted to be swung into driving engagement with either one of said spools, means for rotating said pawl about the axis of said spools, and means controlled by the ribbon but independent of the pull on said ribbon for shifting said pawl from one of said spools to the other to reverse the feed of the ribbon.

21. In a typewriting machine, the combination of two ribbon spools mounted side by side, a pawl mounted between said ribbon spools and pivoted to be swung into driving engagement with either one of said spools, means for rotating said pawl about the axis of said spools, and means controlled by the ribbon but independent of the pull on said ribbon and hand operated means for shifting said pawl from one of said spools to the other to reverse the feed of the ribbon.

22. In a typewriting machine, the combination of two ribbon spools mounted side by side, a pawl mounted between said ribbon spools and pivoted to be swung into driving engagement with either one of said spools, means for rotating said pawl about the axis of said spools, and a ribbon controlled cam for shifting said pawl from one of said spools to the other to reverse the feed of the ribbon.

23. In a typewriting machine, the combination of two ribbon spools mounted side by side, a pawl mounted between said ribbon spools and pivoted to be swung into driving engagement with either one of said spools, means for rotating said pawl about the axis of said spools, and two cams controlled by the ribbon on the spools for shifting said pawl from one of said spools to the other to reverse the feed of the ribbon.

24. In a typewriting machine, the combination of a driving shaft, two ribbon spools mounted side by side coaxial with said shaft, a ratchet for each of said ribbon spools, a driving dog pivotally mounted on said shaft and shiftable about its pivot into engagement with either one of said ratchets, and a hand operated slide mounted in said shaft for shifting said pivoted dog.

25. In a typewriting machine, the combination of a driving shaft, two ribbon spools mounted side by side on said shaft, a ratchet for each of said ribbon spools, a driving dog pivotally mounted on said shaft and shiftable about its pivot into engagement with either one of said ratchets, and a hand operated slide mounted in said shaft for shifting said pivoted dog.

26. In a typewriting machine, the combination of a driving shaft, two ribbon spools mounted side by side coaxial with said shaft, a ratchet for each of said ribbon spools, a driving dog pivoted on said driving shaft between said ratchets and shiftable about its pivot into engagement with either one of said ratchets, an arm that engages the ribbon on one of said spools, and means controlled by said arm for automatically shifting said driving dog into engagement with the ratchet of said spool when the ribbon on said spool is exhausted.

27. In a typewriting machine, the combination of a driving shaft, two ribbon spools mounted side by side coaxial with said shaft, a ratchet for each of said spools, an arm pivotally mounted on said shaft between said ratchets, and ribbon controlled cams adapted to engage said arm as it rotates with said shaft and to shift said arm out of engagement with one of said ratchets and into engagement with the other of said ratchets.

28. In a typewriting machine, the combination of a driving shaft, a ribbon spool coaxial with said driving shaft, a ratchet for said ribbon spool, and an arm pivotally mounted on said shaft and movable into and out of engagement with said ratchet, the pivot of said arm being so disposed that when said arm is swung from one spool to the other its operative end moves in a path approximately parallel with the axis of said spools.

29. In a typewriting machine, the combination of a driving shaft, a ribbon spool mounted coaxially with said driving shaft, a ratchet for said ribbon spool, an arm pivotally mounted on said shaft and movable about its pivot into and out of engagement with said ratchet, and means controlled by the ribbon on said spool but independent of the pull on said ribbon for moving said arm into engagement with said ratchet.

30. In a typewriting machine, the combination of a ribbon spool, a driving shaft coaxial with said ribbon spool, an arm pivoted on said shaft and movable about its pivot into and out of driving connection with said ribbon spool, a pivoted member for automatically shifting said arm, said member comprising an arm that engages the ribbon on the spool and another arm having a cam which, when the ribbon is nearly exhausted from the spool, moves into the path of said pivoted driving arm and cams said arm into position to drive said spool.

31. In a typewriting machine, the combination of a driving shaft, two ribbon spools mounted side by side coaxial with said shaft, a driving arm pivotally mounted on said shaft between said spools and adapted to be moved about its pivot into position to drive either one of said spools, and two pivoted shifting members, one for each of said spools, each of said shifting members comprising an arm that engages the ribbon on its spool and another arm having a cam which, when the ribbon is about exhausted from the spool, moves into the path of said driving arm and cams said arm into position to drive said spool.

32. In a typewriting machine, the combination of ribbon spools, a ribbon vibrator that is moved toward and from the printing point, and means for guiding said ribbon from said spools to said vibrator, the relation of the different parts being such that when the ribbon is moved by the vibrator to cover the printing point the tension on the ribbon is diminished.

33. In a typewriting machine, the combination of a ribbon vibrator, means for operating said ribbon vibrator comprising a pivotally mounted arm hinged to said ribbon vibrator, ribbon spools and guides for conducting the ribbon from the spools to the vibrator in such fashion that the ribbon runs over the pivotal center of said arm and under the hinged connection between said arm and the ribbon vibrator, whereby when the ribbon is thrown to the printing point the tension on said ribbon is diminished.

34. In a typewriting machine, the combination of a ribbon vibrator, means for actuating said vibrator comprising an arm hinged to said ribbon vibrator, and a shaft or axle on which said arm is mounted, ribbon spools situated back of and below said shaft or axle, and means for guiding the ribbon from said spools to said vibrator over said shaft or axle and under said hinge, whereby when the vibrator is moved to the printing point the tension on the ribbon is diminished.

35. In a typewriting machine, the combination with the main frame, of an auxiliary frame detachably secured to said main frame, and ribbon spools, ribbon spool driving mechanism, and escapement mechanism mounted in said auxiliary frame.

36. In a typewriting machine, the combination with the main frame, of an auxiliary frame detachably secured to said main frame and having mounted therein a ribbon spool, a driving spring, and means whereby said ribbon spool is driven by said spring.

37. In a typewriting machine, the combination with the main frame, of an auxiliary frame detachably secured to said main frame and having mounted therein a pair of ribbon spools, a driving spring, and means whereby either one of said spools may be driven by said spring.

38. In a typewriting machine, the combination with the main frame, of an auxiliary frame detachably secured to said main frame and having mounted therein a pair of ribbon spools, driving means for said ribbon spools, and means for disconnecting said driving means from one of said spools and connecting it with the other to reverse the feed of the ribbon, said auxiliary frame, ribbon spools, driving means and reversing means being detachable as an entirety from the main frame of the machine.

39. In a typewriting machine, the combination with the main frame, of an auxiliary frame detachably secured to said main frame and having mounted therein a pair of ribbon spools, driving means for said ribbon spools, hand operated means for reversing the ribbon feed, and automatic means for reversing the ribbon feed.

40. In a typewriting machine, the combination with the main frame and the carriage, of an auxiliary frame detachably secured to said main frame and having mounted therein means for driving the carriage, a ribbon spool, and means whereby said carriage driving means also drives said ribbon spool.

41. In a typewriting machine, the combination with the main frame and the carriage, of an auxiliary frame detachably secured to said main frame and having mounted therein carriage driving means, escapement mechanism, ribbon spools, and means whereby said carriage driving means also drives said ribbon spools.

42. In a typewriting machine, the combination with the main frame and the carriage, of an auxiliary frame detachably secured to said main frame, and having mounted therein a carriage driving spring, a shaft rotated by said spring, and ribbon spools mounted on and driven by said shaft.

43. In a typewriting machine, the combination with the main frame and the carriage, of an auxiliary frame detachably secured to said main frame below the top plate and having mounted therein a carriage driving spring, a transverse shaft driven in one direction by said driving spring, and two ribbon spools mounted on and driven by said shaft, said spools being situated side by side below and back of the printing point.

44. In a typewriting machine, the combination with the main frame and the carriage, of a shaft having a spring drum mounted thereon, means whereby said carriage is driven by the spring in said spring drum, a transverse shaft below the first mentioned shaft, a skew gear on the first mentioned shaft and meshing with a skew gear on the transverse shaft, one of said skew gears being loose on its shaft and having pawl and ratchet connection therewith, and ribbon spools mounted on said transverse shaft.

45. In a front strike typewriting machine, the combination with the types and the carriage having a platen mounted therein, of carriage feed mechanism comprising a universal bar in front of the platen near the printing point, and a ribbon vibrator for guiding an ink ribbon between said universal bar and the platen.

46. In a front strike typewriting machine, the combination with the types and the carriage having a platen mounted therein, of carriage feed mechanism comprising a universal bar in front of the platen near the printing point, and a ribbon vibrator adapted to guide an ink ribbon between said universal bar and the platen.

47. In a front strike typewriting machine, the combination with the types and the carriage having a platen mounted therein, of carriage feed mechanism comprising a universal bar, and means for supporting said universal bar in front of the platen near the printing point, and ribbon guiding devices straddling said universal bar and its support.

48. In a front strike typewriting machine, the combination with the types and the carriage having a platen mounted therein, of step-by-step carriage feed mechanism near the printing point, and ribbon guiding mechanism straddling part of said step-by-step feed mechanism.

49. In a front strike typewriting machine, the combination with the types and the carriage having a platen mounted therein, of step-by-step carriage feed mechanism near the printing point, and ribbon vibrator devices straddling part of said step-by-step mechanism.

50. In a front strike typewriting machine, the combination with the types and the carriage having a platen mounted therein, of a ribbon vibrator, a forked guide for said ribbon vibrator, and a universal bar mounted on an arm or lever that projects between the forks of said guide in front of said vibrator.

51. In a front strike typewriting machine, the combination with the types and the carriage having a platen mounted therein, of carriage feed mechanism comprising a universal bar near the printing point, and a bracket on which said universal bar is mounted, and ribbon mechanism comprising a bifurcated ribbon vibrator and a bifurcated arm for actuating said vibrator, said ribbon devices straddling part of said carriage feed devices.

52. In a front strike typewriting machine, the combination with the types and the carriage, of a universal bar near the printing point, and means for guiding an ink ribbon across the printing point and down on each side of said universal bar.

53. In a typewriting machine, the combination of a ribbon, key actuated universal bar mechanism, permanently maintained connections between said universal bar mechanism and ribbon, and means for shifting said connections at the universal bar mechanism for rendering the universal bar inoperative to move the ribbon to operative position.

54. In a typewriting machine, the combination of a ribbon having a plurality of fields of different characteristics, key actuated universal bar mechanism, permanently maintained connections between said universal bar mechanism and ribbon, and means for shifting said connections at the universal bar mechanism for determining which field of the ribbon shall be presented to operative position or for rendering the universal bar inoperative to move the ribbon to operative position as may be desired.

55. In a typewriting machine, the combination of a ribbon vibrator, an actuating lever for said vibrator, a constantly maintained pivot for said lever, a universal bar, constantly maintained and positive connections between said universal bar and said lever, and means for rendering said mechanism inoperative to bring the ribbon to the printing point.

56. In a typewriting machine, the combination of a ribbon, a ribbon vibrator, key-actuated devices, universal bar mechanism comprising a universal bar coöperating with and maintaining a constant normal relation to said key-actuated devices, intermediate constantly maintained connections between said universal bar mechanism and vibrator, said connections including a lever for actuating said vibrator, and means forming part of said connections and adjustable at the universal bar mechanism for determining whether or not the ribbon shall be presented to operative position.

57. In a typewriting machine, the combination of a ribbon having fields of different characteristics, a ribbon vibrator, key actuated devices, universal bar mechanism comprising a universal bar coöperating with and maintaining a constant normal relation to said key actuated devices, intermediate constantly maintained connections between said universal bar mechanism and vibrator, said connections including a lever for actuating said vibrator, said connections including a part adjustable at the universal bar mechanism for determining which field of the ribbon shall be presented to operative position and for rendering the said key actuated devices inoperative to move the ribbon to operative position.

58. In a typewriting machine, the combination of a vibratory ribbon carrier having a single unvarying normal position, moving means therefor pivotally connected therewith, actuating means for said moving means, and means for shifting the moving means to vary the point on said actuating means at which said moving means is connected with said actuating means and thereby to vary the throw of the ribbon carrier without varying its normal position.

59. In a typewriting machine, the combination of a vibratory ribbon carrier, moving means therefor including a rocking device connected with said ribbon carrier and a link for actuating said rocking device, and actuating means for said link, said link being adjustable to connect with its actuating means at different points to vary the throw of the ribbon carrier.

60. In a typewriting machine, the combination of a ribbon vibrator, a rocking member for actuating said ribbon vibrator, a reciprocatory link for actuating said rocking member, means for reciprocating said link, and means for varying the extent of motion of said link.

61. In a typewriting machine, the combination of a ribbon vibrator, an operating lever therefor, a key actuated universal bar, connections including a link between said universal bar and said lever, said link being movable by said universal bar, and means for rendering said universal bar when operated inoperative to move said link.

62. In a typewriting machine, the combination of a ribbon vibrator, an actuating device connected therewith, and a rocking member operative on said actuating device, said device being movable into such relation to said rocking member as to cause the vibrator to be thrown to the printing position and movable out of said relation to said rocking member, so as to prevent the vibrator from being thrown to printing position.

63. In a typewriting machine, the combination of a ribbon vibrator, an actuating member connected therewith, and a rocking member adapted to actuate said actuating member, one of said members being movable while the vibrator is away from the printing point into such relation to the other as to cause the vibrator to be thrown to the printing position, and movable out of said relation so as to prevent the vibrator from being thrown to printing position.

64. In a typewriting machine, the combination of a ribbon vibrator, a link for operating said ribbon vibrator, a rocking member for operating said link, said link being movable to different positions in which its longitudinal axis bears different relations to said rocking member, one of said positions being such that said rocking member is inoperative to move said ribbon vibrator to printing position.

65. In a typewriting machine, the combination of a ribbon vibrator, means for operating said ribbon vibrator, and means for varying the operation of said ribbon vibrator, said means including a part movable to different positions, stops for arresting said part in a plurality of positions, spring means for holding said part against either of said stops, key actuated means for moving said part from one of said stops to another, and means for moving one of said stops so as to afford to said part a motion to an additional position.

66. In a typewriting machine and in ribbon mechanism, the combination of printing keys, a ribbon vibrator, means for operating said vibrator at the strokes of the printing keys, two controlling keys and connections for changing the position to which the vibrator is thrown by the actuation of the printing keys, each of said controlling keys determining a longitudinal field of the ribbon to be brought opposite the printing point; and a third controlling key and connections for rendering the vibrator mechanism inoperative to move the ribbon to the printing point.

67. In a typewriting machine and in ribbon mechanism, the combination of printing keys, ribbon vibrating mechanism, three keys for controlling the operation of said ribbon vibrating mechanism, means whereby one of said controlling keys causes an upper stripe of the ribbon to be brought to the printing point, means whereby another of said controlling keys causes a lower stripe of the ribbon to be brought to the printing point, and means whereby the third controlling key prevents the ribbon from being moved to the printing point by the vibrating mechanism.

68. In a typewriting machine, the combination of a vibratory ribbon carrier, moving means therefor including a rocking device connected with said ribbon carrier, a link for actuating said rocking device, a second rocking device having an arm for actuating said link, and means for moving said link along said arm to points at different distances from the axis of said rocking device to vary the throw of said link and ribbon carrier.

69. In a typewriting machine, the combination of printing keys, a universal bar operated by said keys, a rock shaft operated by said universal bar and having an arm, a link arranged to be operated by said arm, means for sliding said link along said arm to vary the point of connection between said link and arm in order to vary the extent of motion imparted by said arm to said link, a rocking device or lever to which said link is connected, and a ribbon vibrator operated by said rocking device or lever.

70. In a typewriting machine, the combination of a universal bar controlling the carriage escapement, and a ribbon vibrating mechanism independent of said universal bar and constructed to move the ribbon to the printing position with a substantially uniform motion in advance of the operation of said universal bar, substantially as set forth.

71. In a typewriting machine, the combination of a universal bar controlling the carriage escapement, and ribbon vibrating mechanism including a second universal bar which is actuated to place the ribbon in printing position in advance of the actuation of said universal bar for the carriage escapement, substantially as set forth.

72. In a typewriting machine, the combination of type-bars, key levers therefor, a carriage escapement, a universal bar for the carriage escapement actuated by the impacts of the type-bars, and a ribbon vibrating mechanism which is independent of said universal bar for the carriage escapement and is actuated by the key levers for vibrating the ribbon with a substantially uniform movement, substantially as set forth.

Signed at the borough of Manhattan, city of New York, in the county of New York, and State of New York this 8th day of March, A. D. 1906.

ALEXANDER T. BROWN.

Witnesses:
E. M. WELLS,
M. F. HANNWEBER.